(12) United States Patent
Quinn et al.

(10) Patent No.: US 7,016,261 B2
(45) Date of Patent: Mar. 21, 2006

(54) DEEP PENETRATING FOCUSED ARRAY

(75) Inventors: Daniel J. Quinn, Spring, TX (US); John W. Gillespie, Katy, TX (US)

(73) Assignee: Baker Hughes, Incorporated, Houston, TX (US)

( * ) Notice: Subject to any disclaimer, the term of this patent is extended or adjusted under 35 U.S.C. 154(b) by 136 days.

(21) Appl. No.: 10/316,154

(22) Filed: Dec. 9, 2002

(65) Prior Publication Data

US 2004/0109389 A1 Jun. 10, 2004

(51) Int. Cl.
*G01V 1/38* (2006.01)
*G01V 1/04* (2006.01)

(52) U.S. Cl. .......................... 367/144; 367/15; 181/120
(58) Field of Classification Search .................. 367/16, 367/23, 144, 15; 166/249; 181/106, 110, 181/111, 118, 120, 105
See application file for complete search history.

(56) References Cited

U.S. PATENT DOCUMENTS

| | | | |
|---|---|---|---|
| 4,956,822 A | 9/1990 | Barber | |
| 4,970,046 A | 11/1990 | Dolengowski | |
| 5,051,966 A | 9/1991 | Gjestrum | |
| 5,144,588 A * | 9/1992 | Johnston et al. | 367/16 |
| 5,164,922 A | 11/1992 | Cappelen | |
| 5,212,669 A * | 5/1993 | Jenkins | 367/144 |
| 5,281,773 A * | 1/1994 | Duren | 181/111 |
| 5,459,404 A | 10/1995 | Joseph | |
| 5,469,404 A * | 11/1995 | Barber et al. | 367/23 |
| 5,475,188 A | 12/1995 | Cappelen | |
| 6,061,635 A | 5/2000 | Barber | |
| 6,091,668 A * | 7/2000 | Barber, Sr. | 367/15 |
| 6,404,701 B1 | 6/2002 | Stottlemyer | |
| 2003/0151974 A1* | 8/2003 | Kutty et al. | 367/23 |
| 2004/0000446 A1* | 1/2004 | Barber | 181/120 |

* cited by examiner

*Primary Examiner*—Ian J. Lobo
(74) *Attorney, Agent, or Firm*—Timothy Donoughue; Keith R. Derrington

(57) ABSTRACT

Disclosed herein is a single point seismic system comprising an array of air guns disposed within a frame. The array includes a cluster of air guns on one of its ends and a reduction in chamber size of the air guns along the length of the array. On the end of the array opposite the cluster the array can comprise a series of air guns whose chamber size is an order of magnitude less than the chamber size of the guns comprising the cluster. The middle of the array can comprise a series of air guns whose respective chamber volumes differ by an order of magnitude. The frame of the present invention is generally wholly submerged during operation and does not interfere with the seismic signal produced by the firing of the air guns.

10 Claims, 4 Drawing Sheets

DEEP PENETRATING FOCUSED ARRAY

BACKGROUND OF THE INVENTION

1. Field of the Invention

The invention relates generally to the field of oil and gas exploration. More specifically, the present invention relates to an apparatus single point seismic source useful for producing seismic signals.

2. Description of Related Art

Marine seismic exploration generally involves activating a seismic source within a body of water to produce a seismic signal. The signal, which is a sonic pulse or shock wave, propagates through the water and into the geologic formations beneath the body of water. The signal reflects back from the geologic formation as an acoustic wave, which can be recorded by a variety of recording devices, such as geophones, hydrophones, or other like equipment. The recording device or devices can be positioned within the body of water or within a specific wellbore. Positioning the recording devices within a wellbore is known as vertical seismic profiling (VSP). The recorded acoustic wave signal can then be processed and converted into an electronic form for subsequent analysis and interpretation. The result of the analysis provides the structure of the geologic formations under the body of water that can reveal possible hydrocarbon bearing formations. The body of water generally considered here is an ocean, sea, or gulf, but could also include marshes, swamps, lakes, or rivers, or any body having sufficient water depth enabling use of the seismic source.

Many seismic sources are available to produce seismic signals within a body of water. Explosives, such as dynamite, bubble producing capacitors, water guns, and explosive gases have all been used in the past. The current trend however has focused use of devices that discharge compressed gases under the surface of the water. One popular such device is the air gun that is connected to a source of high pressure air having a pressure in the range of from 1000 lbs/in$^2$ to over 6,000 lbs/in$^2$. When fired, the gun releases the high pressure air through a valve in its body; the escaping air expands and forms a large bubble within the body of water. A seismic signal is produced by the action of the air being discharged from the air gun and subsequently expanding.

Since water is a better medium than air for transmitting a seismic signal, the air guns are positioned below the water's surface, generally in the range of 3 feet to 25 feet below the surface of the water. It is preferred to place the air guns from 10 feet to 20 feet below the surface of the body of water. Positioning the air gun at this depth ensures that the bubble produced by the air escaping the air gun fully forms and coalesces before it contacts the water's surface. If the air gun were fired at or just below the water's surface and the resulting bubble did not fully form but instead just blew past the surface of the water, the resulting seismic signal would be less than the seismic signal produced when the bubble does fully form. When the air gun is positioned at a proper depth and the bubble is permitted to form, the size of the bubble will oscillate as it travels towards the water's surface. The bubble oscillations also produce an acoustic signal, which while recordable, is generally much less than the initial acoustic signal produced by the air gun.

The performance, or signature, of an air gun can be recorded by far field measurements during actual use, or can be modeled using computers and specially crafted software. The performance is typically measured by analyzing more than one signature. Some of the possible signatures are an output signature (FIG. 1) and an amplitude spectrum (FIG. 2). Both FIGS. 1 and 2 represent synthetic test data regarding the subject invention. The output signature reflects the seismic magnitude of the original acoustic signal as well as the acoustic signal produced by the bubble oscillation. FIG. 1 is illustrative of the pattern of a typical air gun output signature where the acoustic signals are plotted in terms of a pressure wave (bars @ 1 m or bar m) in relation to time (msec). The peak value of the primary acoustic signal is represented by reference numbers 10 and 12 and the magnitude of the bubble oscillations is represented by reference numbers 14 and 16. The corresponding pressure values from this graph can be easily referenced to determine the output, the peak to peak value, and the peak to bubble ratio. The reference number 12 represents the inverted mirror image of the primary pulse and is created by an almost perfect reflection at the water surface. This reflection is also known as the trough or ghost. The zero to peak value is determined by the value at reference number 10. The peak to peak value is determined by the range from reference number 10 to reference number 12. The reference numbers 14 and 16 refer to the next greatest peak and trough emanating from the oscillating bubble and is well suppressed in this example. The peak to bubble ratio is determined by the ratio of the range 10 to 12 to the range 14 to 16. In an ideal case, the bubble signature would be zero. However this is not practical with an air gun system, so the system is designed to maximize the peak to peak values and minimize the bubble oscillation.

Increasing the output of the signal source in turn increases the depth that the seismic signal penetrates the geophysical formation, thereby increasing the amount of geological information that is subsequently reflected back to the recording devices. As might be expected, it is desired then to maximize the output of the seismic signal in order to obtain as much geological information as possible. However, increasing the output of the primary seismic signal in turn produces larger bubbles that cause a larger bubble oscillation. Thereby reducing the peak to bubble ratio. Because the bubble has its own associated seismic signal, increasing the bubble oscillation increases the bubble seismic signal. The increased bubble seismic signal produces interference with the primary seismic source and can negate the advantage of increasing the output magnitude.

One method of overcoming the interference of the bubble oscillation is to assemble an array of air guns whose combined seismic signature has an increased output without a correspondingly increased bubble seismic signal. Thus by combining two or more air guns in an array an output signal can be increased without decreasing the peak to bubble ratio. Taken one step further, the chamber volumes of the air guns can be varied in size and the physical arrangement and spacing of the air guns can be altered in order to obtain a specific output signature. This process is better known as "tuning." A discussion and a list of references that discuss tuning air gun arrays can be found in Barber et al., U.S. Pat. No. 4,956,822, which is incorporated by reference herein in its entirety.

Spacing adjacent air guns a certain distance (d) apart can modify the peak output and frequency content of the seismic signal produced by each air gun. This will occur when the value of d is less $12 \times V^{1/3}$, where V is volume of the air gun chamber in cubic inches. When adjacent air guns are spaced at some distance less than d, the seismic signal of the two closely spaced air guns will closely replicate that of a single air gun having a chamber size approximately equal to the sum of the chambers of the individual air guns. When two or more adjacent air guns are located at or closer than this "d" value such that the combined seismic signal mimics a single air gun having the size of the aggregate guns, that particular group of air guns is referred to as a "cluster" of air guns.

One reason to vary the chamber sizes of the air guns is so that the bubbles produced by the air guns of different chamber sizes will have a correspondingly different volume. Because bubbles of different volume oscillate at a different frequency, these multiple sized bubbles oscillating at different frequencies tend to attenuate the bubble oscillation effect through destructive interference. Varying the air gun chamber size also broadens the frequency spectrum over which the seismic signal produces an output. Seismic signals within a higher frequency provide results having higher resolution than lower frequency signals. Whereas lower frequency seismic signals can penetrate deeper within a geological formation than higher frequency seismic signals are able to Since both ends of the seismic signal spectral range produce useful results, it is desired to produce a seismic signal that has output signals across a wide range of low and high frequencies.

Many publications exist regarding the tuning of air gun arrays, however to date many arrays developed are large, cumbersome, and heavy and also require numerous air guns. Not only are these large arrays expensive and difficult to maintain, their large size requires special handling equipment. Further, since most air gun arrays are used in open seas, even normal weather days can provide for a dangerous handling situation. Therefore a need exists for an air gun array that is not only manageable and compact; but also produces a seismic signal having an acceptable peak to bubble ratio with a wide range of output frequencies.

Further, the geological formations of many regions have been analyzed and the underlying formations are currently known, but due to technological constraints that analysis has been performed only to a limited depth. Thus in order to map deeper formations and learn of other potential hydrocarbon producing zones, a need exists for air gun arrays that can produce seismic signals that penetrate deeper into geologic formations than is currently performed.

BRIEF SUMMARY OF THE INVENTION

The present invention involves a single point seismic source comprising a frame and a plurality of air guns secured to the frame. Each of said air guns comprising an inlet port, an outlet port, and a chamber. The plurality of air guns are formed into an array on the frame, where the array has a first end and a second end and an air gun cluster disposed at its first end. The array further comprises a series of air guns positioned at the array second end each having a chamber whose volume is smaller by an order of magnitude of a least a factor of two or more than the chamber volume of the air guns of the air gun cluster.

The array produces a seismic signal capable of deep penetration within a geological formation lying at the bottom of a body of water over a large spectral range. Further, the array operates in conjunction with a seismic recording device situated within a wellbore located below the body of water.

The plurality of air guns have chamber volumes ranging from 150 cubic inches to 300 cubic inches. The air gun cluster produces a seismic signal substantially the same as an air gun having a volume equal to the sum of the air guns of the cluster. The air gun cluster is comprised of at least two air guns. Each air gun of the array of the present invention is positioned substantially within a single horizontal plane.

The array of the present invention comprises a middle section disposed between the first end and the second end. The middle section comprises at least two air guns whose respective air gun chambers differ by an order of magnitude of at least a factor of two. The frame of the present invention is dimensioned such that during firing of the air guns of the array the frame is totally submerged within a body of water and does not interfere with the seismic signal produced by the firing of the air guns.

The single point seismic source comprises a first, second, third, fourth, fifth, and sixth air guns all in the same horizontal plane. The air guns of the seismic source are arranged within a cluster section, a middle section, and an end section, where the first and second air guns comprise the cluster section and are disposed adjacent from one another a distance of approximately one meter. The third and fourth air guns comprise the middle section and are disposed adjacent from one another a distance of approximately two meters. The fifth and sixth sir guns comprise the end section and are disposed apart from one another a distance of approximately two meters, and where the middle section is behind the cluster section a distance of approximately from two to three meters, and the end section is behind the cluster section a distance of approximately from four to five meters. The first, second, and third air guns have a chamber volume of approximately 300 inch$^3$ and the fourth, fifth, and sixth air guns each have a chamber volume of approximately 150 inch$^3$.

DETAILED DESCRIPTION OF THE INVENTION

Figure 3:
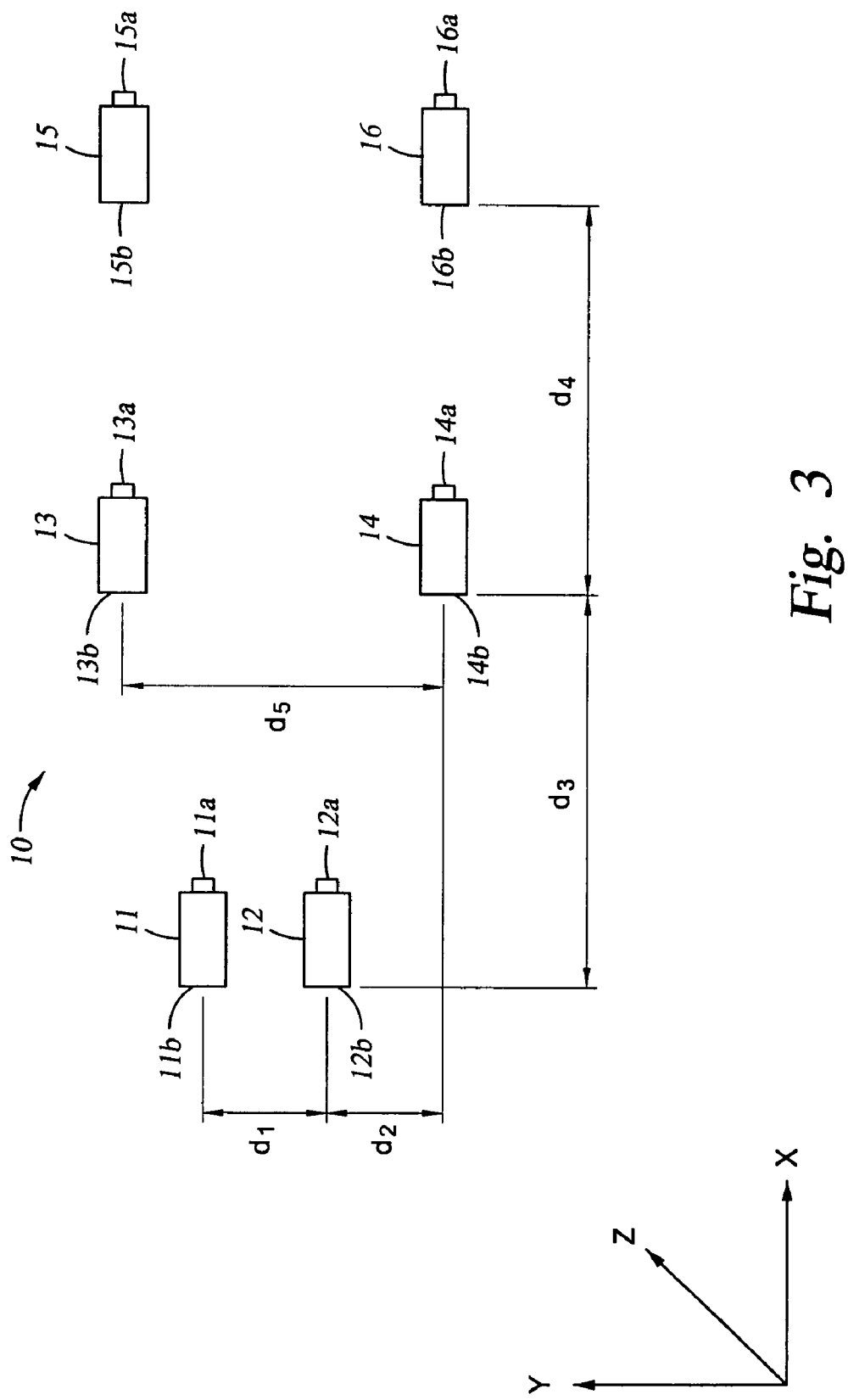
FIG. 3 depicts an array configuration of one embodiment of the present invention.
Figure 4:
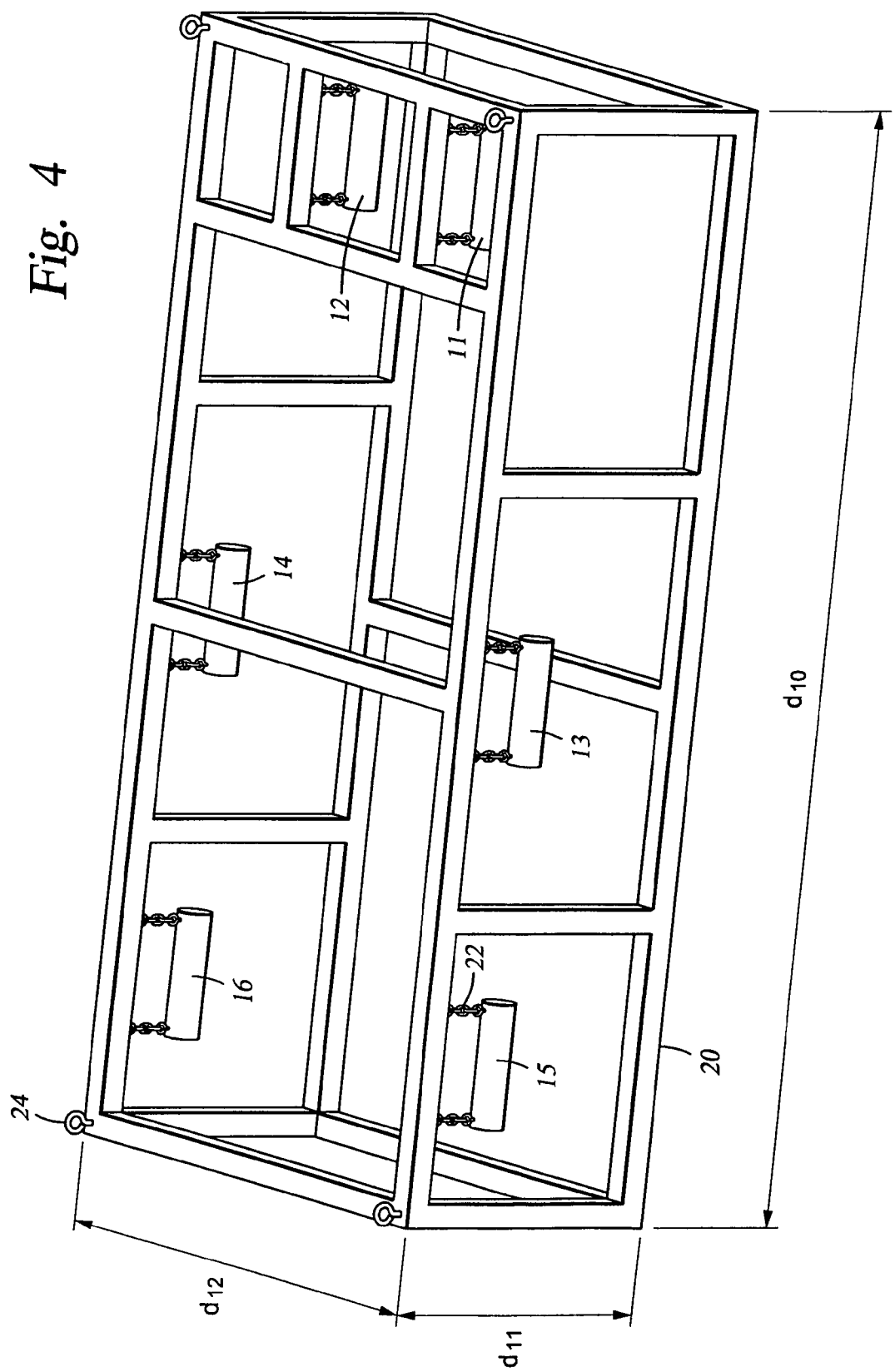
FIG. 4 is a perspective view of one embodiment of a rack for use in conjunction with the present invention.

With reference to the drawing herein, a schematic representation of one embodiment of a seismic air gun array 10 of the present invention is illustrated in FIG. 3. Preferably the air guns (11–16) are of the sleeve gun variety and are commercially available from Input/Output located in Houston, Tex. Each gun is equipped with an inlet port (11a–16a) designed to receive high pressure gas from an inlet line (not shown) that is stored within the chamber of each air gun. While the present invention realizes advantages at the full range of air pressure supplied, it is preferred that the high pressure gas for use in the present invention be air at 2000 lb/in$^2$.

When the air guns (11–16) are actuated or fired, the high pressure gas stored within the air gun chamber is released via the outlet ports (11b–16b). The energy stored within the compressed high pressure gas is converted into a seismic signal as the gas is released from the outlet ports (11b–16b). Further, the preferred seismic signal is produced by the array of the present invention when the air guns (11–16) are fired substantially simultaneously.

Due to the size and capacity of the air gun array 10 of the present invention, better use can be realized with VSP applications. Thus the seismic signal of the air gun array 10 would generally be recorded by a recording device situated within a wellbore underneath a body of water.

For the sake of clarity, an XYZ axis is included with FIG. 3 indicating spatial coordinate reference points. The view of FIG. 3 is from above, thus while each air gun is horizontally displaced from each of the other air guns, it is preferred that the air guns be substantially at the same elevation. Thus in referring to the reference XYZ axis, each air gun is preferably located at approximately the same value of "Z."

As shown, the seismic air gun array 10 includes six air guns (11–16) arranged linearly where air guns 11 and 12 are arranged in a cluster. As noted previously, air guns 11 and 12 form a cluster when placed apart from each other a certain distance such that when both guns are fired the resulting seismic signal is approximately equal in magnitude (i.e. peak to peak values) as that of a seismic signal produced by an air gun whose chamber volume is equal to the sum of the chamber volume of air gun 11 and air gun 12. None of the remaining air guns (13–16) are within a close enough vicinity of any adjacent air gun to produce a cluster.

While the air guns (11–16) are preferably of the same type, their chamber volumes are not all the same. In the preferred embodiment air guns 11 and 12 each have a chamber volume of 300 inch$^3$. Since these two air guns are preferably clustered, this results in an array whose end is supplied with a virtual chamber volume of 600 inch$^3$. Although none of the remaining air guns comprise an air gun cluster, they were each disposed in a location to minimize the distance between adjacent guns—and thereby minimize the total size of the air gun array.

Further, it was found that superior results in seismic signals are realized by producing an array where the chamber volume of the constituent air guns varied. As noted above, one end of the array 10 includes a cluster having an effective volume of 600 inch$^3$. One effect of having a large cluster on an end is that a seismic signal of large magnitude is produced. Again, this is desired since seismic signals of large magnitudes are capable of deeper penetration of geological formations, and thus provide a broader range of formation data. Additionally, since a cluster is employed instead of a single large air gun, the bubble oscillation pulse associated with a large single air gun is not present. Thus the resolution of the formation data is not skewed or interfered with by the seismic signal of the bubble oscillation—which also produces enhanced data results.

In addition to the end clustering of the array 10, the present invention employed the use of air guns with different chamber volumes. In the preferred embodiment air guns 11, 12, and 13 each have a chamber volume of 300 inch$^3$, while air guns 14, 15, 16 have a chamber volume of 150 inch$^3$. Implementing air guns whose respective chamber volumes vary produces a seismic source having a strong and effective seismic signal that operates over a large range of frequencies. However, the location of the air guns (11–16) having different chamber volumes can vary. For example, the middle section can comprise guns of greater chamber volume than guns on the end of the array. Thus an air gun array can be produced where the middle guns (13 and 14) each have chamber volumes of 300 inch$^3$ and the end guns (15 and 16) have 150 inch$^3$ or 300 inch$^3$, some other chamber volume, or some combination thereof. Further, the air guns comprising the cluster can also have differing chamber volumes, as long as the combination produces a cluster effect. As previously noted, a strong seismic signal also having a broad spectral range can penetrate geological formations deeper than seismic signals having a more narrow spectral range as well as produce data with high resolution.

Figure 1:
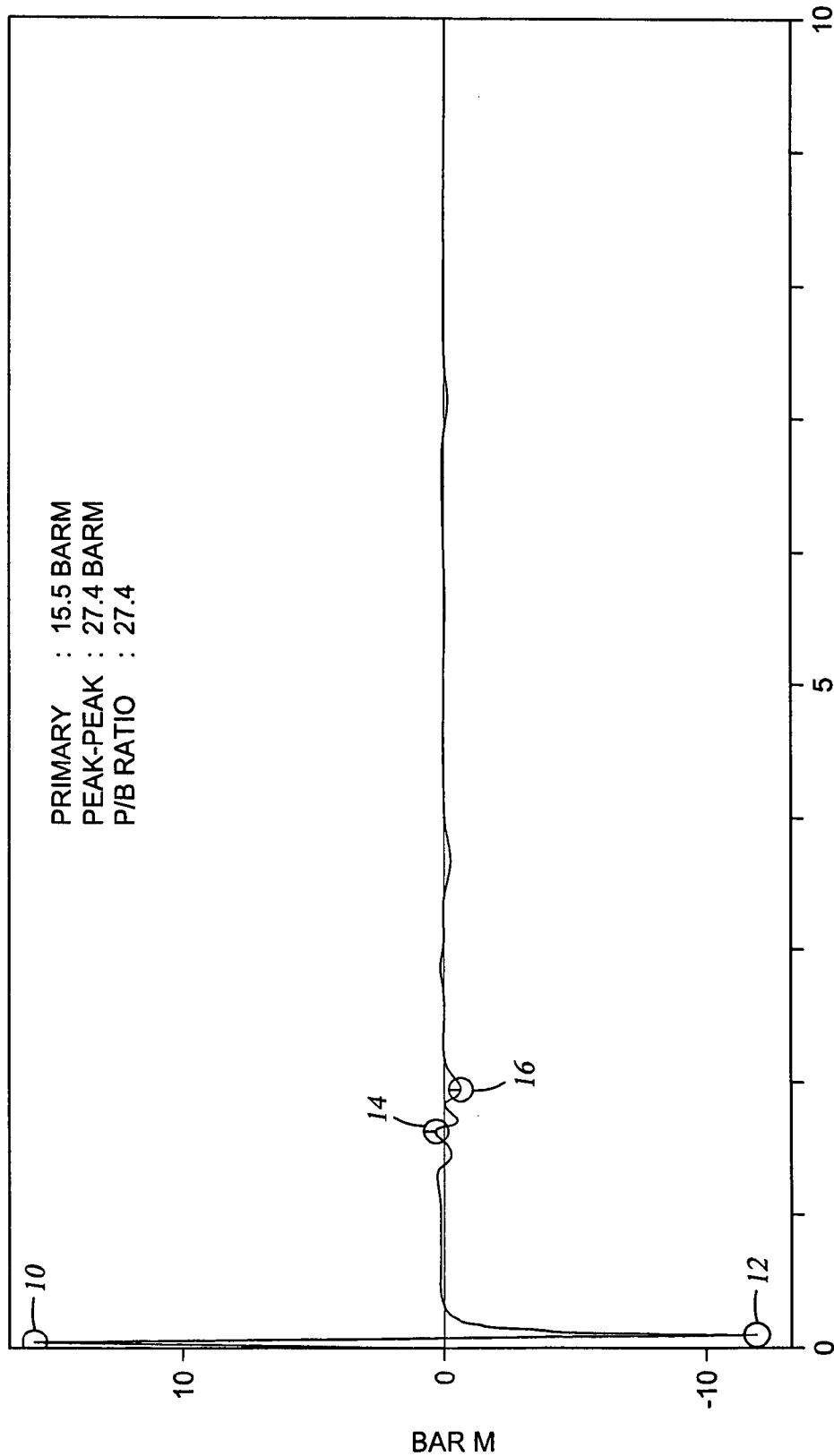
FIG. 1 depicts a far-field signature of an array of the present invention in pressure versus time.

Synthetic modeling using SERES software was conducted that simulated operational results of the present invention. These results are displayed in FIGS. 1 and 2. The array signature is illustrated in FIG. 1 indicates the excellent results attainable with the present invention. The peak-to-peak value of the array signature is 27.5 bar m, resulting in a peak to bubble ratio of 27.5; with an open end low cut band pass filter and a high end cut off band pass of 256 Hz with a 72 dB octave slope. Thus, the present invention is capable of producing seismic signals having a high magnitude without the unwanted large seismic signals associated with bubble oscillations that sometimes occur.

Figure 2:
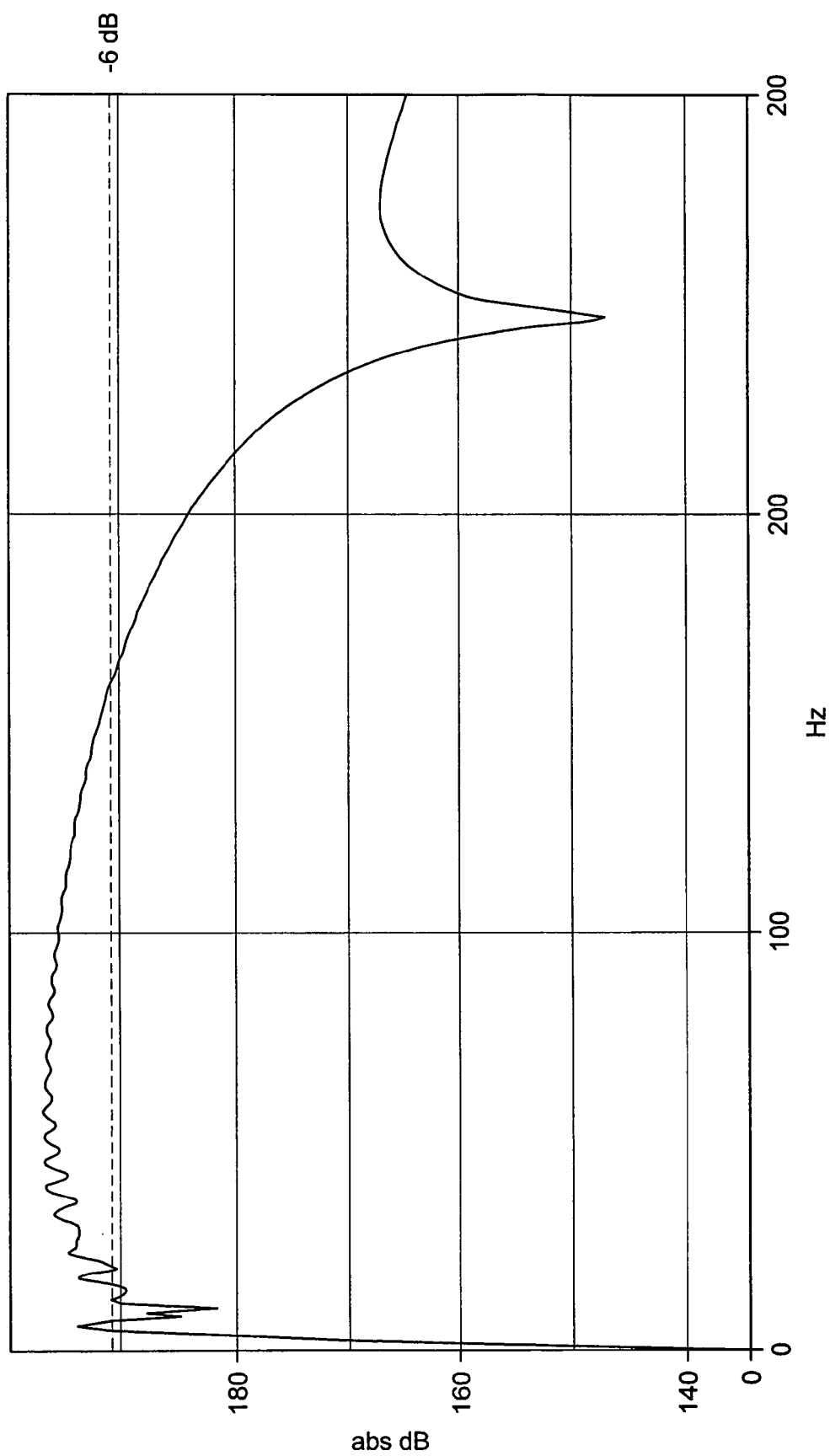
FIG. 2 illustrates an amplitude spectrum of a far-field signature of an array of the present invention.

Additionally the synthetic modeling revealed that the present invention also exhibits a superior amplitude spectrum. FIG. 2 displays the modeled pressure value of the seismic source versus its operational frequency. Those skilled in the art can clearly appreciate from FIG. 2 that the present invention is capable of producing robust seismic signals over a large range of frequencies. As previously discussed this is a desired attribute since a seismic source that distributes its signal over a large frequency range produces high resolution data into a deep depth of the geological formation.

When in use the air gun array 10 is secured within a frame 20. While the frame dimensions can vary, it is preferred that the frame 20 be as compact as possible. Safety and logistical concerns dictate a frame 20 that is easy to manage while loading it onto transport vehicles. A compact lightweight frame is also desired during use as seismic operations can often occur in high seas or inclement weather. Thus a more manageable frame is advantageous not only from an ease of use standpoint, but also with regard to safety. Accordingly the preferred frame dimensions are a length ($d_{10}$) of approximately 6–7 meters, a height ($d_{11}$) of approximately 1 meter, and a width ($d_{12}$) of approximately 2–3 meters. Further, the type and construction of the frame 20 is not critical to the present invention. Any type or construction of frame that can support the air guns (11–16) within the specified positions of the air guns is suitable for the present invention.

Another advantage of the present invention is the combination of the array 10 with the air gun rack 20. Because the air gun array 10 is generally submerged from 1 to 3 meters beneath the body of water, the air gun rack 20 of the present invention would usually be totally submerged. One advantage of the dimensions of the air gun rack 20 of the present invention lies in the theory that racks that ride at or near the surface of the body of water can interfere with the formation of the seismic signal, thus reducing the efficacy of the signal. Therefore it is preferred that the air gun rack 20 closely surround the air gun array 10 and not contact the surface when the air guns are operating.

The preferred manner of attaching the air guns (11–16) within the frame 20 is through the use of chains 22 connected to the air guns (11–16) and the frame 20. However the use of chains 22 is not critical in this application and any method of attaching the air guns (11–16) to the frame 20 can be employed as long as each specific air gun is maintained at the proper depth and in its designated position within the array. Further, as is well known in the art, the attachment device must be able to withstand the repeated force impulses experienced during the firing of the guns.

To obtain a seismic signal from the air gun array 10 that had a high magnitude (i.e. large peak to peak value) over a broad spectral range, it was found that the use of air guns of different sizes (having variable chamber volumes) should be used. While the range of chamber volumes could range from as low as 80 inch$^3$ to 300 inch$^3$, the preferred range of chamber volumes ranges from 150 inch$^3$ to 300 inch$^3$. Further it was found that disposing the largest volume guns on an end of the array yielded desired seismic signals, where the end could be the front or the back end of the array 10. As the array 10 is to be towed behind a vessel during use, the front end is the end closest to the vessel as the array 10 is being towed.

It has also been discovered that arranging the air guns (11–16) based on a ratio of their chamber volume size produces beneficial seismic signal results. For example, not only does disposing a cluster at one end of the array 10 yield large magnitudes in seismic signal, but an arrangement where the center of the array 10 contains guns of different sizes enhances the output seismic signal as well. In the case of the present invention the air guns (13, 14) at center of the array 10 differ by an order of magnitude of one, that is one of the air guns has a chamber volume approximately twice the magnitude as the other air gun. Also it has been found that adding air guns whose chamber size is on the order of 50% of the size of the cluster guns the end of the array 10 opposite the cluster provides good magnitude in addition to enhancing the seismic frequency spectrum. However, the benefits of the present invention can be realized with many different arrangements of air gun chamber volumes, an array having a cluster section, a middle section, and an end section, where the total chamber volume of the air guns within each section differs from each other section, can produce seismic signals that have a broad spectrum and penetrate deep into geological formation. For example, good seismic signals can be realized where the chamber volume of the air guns within the cluster section exceeds the chamber volume of the air guns within either or both the middle section or end section. Good seismic results can also be obtained when the chamber volume of air guns within the middle section is greater than the chamber volume of air guns within the end section, and vice versa.

It should be noted that with the exception of the air guns that form the cluster, all other guns in the array 10 are disposed a distance from the next adjacent air gun such that the air bubbles released from each of these adjacent air guns do not coalesce. However in order to achieve the desired compact dimensions of the array 10, it is preferred that these non-cluster adjacent air guns be positioned at the minimum distance apart without mutual interaction. The following array dimensions were discovered to meet the desired compact array arrangement, with a single cluster end, a superior magnitude of seismic signal over a broad spectral range: $d_1$—approximately 1 meter; $d_3$ and $d_4$—approximately 2–3 meters, and $d_5$—approximately 2–3 meters. However good seismic signal results can be expected by arranging an air gun array with a cluster on one end, a middle section having air guns of varying chamber sizes, and another end with air guns whose total chamber volume is an order of magnitude less than the chamber volume of the air gun cluster.

The present invention described herein, therefore, is well adapted to carry out the objects and attain the ends and advantages mentioned, as well as others inherent therein. While a presently preferred embodiment of the invention has been given for purposes of disclosure, numerous changes exist in the details of procedures for accomplishing the desired results. Such as, the array 10 can comprise an array of eight or more air guns having a cluster on one end and a gradual decrease in chamber volume sizes along the length of the array 10. Further, the manner in which the array 10 is suspended into the water is variable and need not necessarily be towed behind a vessel, but instead could be suspended by a rig crane, or otherwise disposed underneath the water's surface and held stationary during firing. These and other similar modifications will readily suggest themselves to those skilled in the art, and are intended to be encompassed within the spirit of the present invention disclosed herein and the scope of the appended claims.

What is claimed is:

1. A single point seismic source comprising:
an array comprised of air guns, said array having a cluster section, a middle section and an end section,
wherein the chamber volume of the air guns in the cluster section is at least twice the chamber volume of the air guns in the end section and wherein the middle section is comprised of two air guns, wherein one of the middle section air guns has a chamber volume substantially the same as the chamber volume of an air gun of the cluster section and the other middle section air gun has a chamber volume substantially the same as the chamber volume of an air gun of the end section.

2. The single point seismic source of claim 1, wherein said array produces a seismic signal capable of penetration within a geological formation lying at the bottom of a body of water over a spectral range.

3. The single point seismic source of claim 1, where said array operates in conjunction with a seismic recording device situated within a wellbore located below a body of water.

4. The single point seismic source of claim 1, where said plurality of air guns have chamber volumes ranging from 80 cubic inches to 300 cubic inches.

5. The single point seismic source of claim 1, where said air gun cluster produces a seismic signal substantially the same as an air gun having a volume equal to the sum of the air guns of the cluster.

6. The single point seismic source of claim 1, where said air gun cluster is comprised of at least two air guns.

7. The single point seismic source of claim 1, further comprising a frame dimensioned such that during firing of the air guns of the array the frame is totally submerged within a body of water and does not interfere with the seismic signal produced by the firing of the air guns.

8. A single point seismic source comprising:
an air gun array comprising a first, second, third, fourth, fifth, and sixth air guns all in the same horizontal plane arranged within a cluster section, a middle section, and an end section, where the first and second air guns comprise the cluster section and are disposed adjacent from one another a distance of approximately one meter, where the third and fourth air guns comprise the middle section and are disposed adjacent from one another a distance of approximately two meters, where the fifth and sixth sir guns comprise the end section and are disposed apart from one another a distance of approximately two meters, and where the middle section is behind the cluster section a distance of approximately from two to three meters, and the end section is behind the cluster section a distance of approximately from four to five meters.

9. The single point seismic source of claim 8, where the first, second, and third air guns each have a chamber volume of approximately 300 $inch^3$ and the fourth, fifth, and sixth air guns each have a chamber volume of approximately 150 $inch^3$.

10. The single point seismic source of claim 8, where the first, second, and sixth air guns each have a chamber volume of approximately 300 $inch^3$ and the third, fourth, and fifth air guns each have a chamber volume of approximately 150 $inch^3$.

* * * * *